US009658822B1

(12) United States Patent
O'Connor et al.

(10) Patent No.: US 9,658,822 B1
(45) Date of Patent: May 23, 2017

(54) RATE CONTROLLED BUFFER FOR OUTPUT AT EITHER A FIRST OR SECOND RATE RESPONSIVE TO A FILL LEVEL

(71) Applicant: Xilinx, Inc., San Jose, CA (US)

(72) Inventors: Niall J. O'Connor, Randalstown (GB); Amrish J. Patel, Belfast (GB); William G. Dalzell, Newtownabbey (GB)

(73) Assignee: XILINX, INC., San Jose, CA (US)

( * ) Notice: Subject to any disclaimer, the term of this patent is extended or adjusted under 35 U.S.C. 154(b) by 175 days.

(21) Appl. No.: 14/566,962

(22) Filed: Dec. 11, 2014

(51) Int. Cl.
*G06F 3/00* (2006.01)
*G06F 5/14* (2006.01)

(52) U.S. Cl.
CPC .......... *G06F 5/14* (2013.01); *G06F 2205/126* (2013.01)

(58) Field of Classification Search
None
See application file for complete search history.

(56) References Cited

U.S. PATENT DOCUMENTS

| | | | | |
|---|---|---|---|---|
| 5,129,062 A * | 7/1992 | Gygi | ..................... | G06F 13/405 710/315 |
| 5,179,678 A * | 1/1993 | Kawamura | ......... | G06F 12/0802 710/22 |
| 9,043,684 B2 * | 5/2015 | Yang | ................... | G11B 20/1833 714/779 |
| 2004/0054828 A1 * | 3/2004 | Finch | ..................... | G06F 13/387 710/104 |
| 2005/0078660 A1 * | 4/2005 | Wood | .................. | H04L 12/5692 370/352 |
| 2007/0083491 A1 * | 4/2007 | Walmsley | .............. | G06F 21/608 |
| 2010/0165846 A1 * | 7/2010 | Yamaguchi | ........ | H04B 7/15592 370/236 |
| 2012/0020210 A1 * | 1/2012 | Sonnier | ................. | H04L 47/621 370/230.1 |
| 2013/0107769 A1 * | 5/2013 | Khlat | .................... | H03F 1/0227 370/310 |

* cited by examiner

*Primary Examiner* — Henry Tsai
*Assistant Examiner* — Christopher Bartels
(74) *Attorney, Agent, or Firm* — W. Eric Webostad

(57) ABSTRACT

Buffer rate control generally relates to outputting data at either a first rate or a second rate responsive to a fill level of the buffer. In an apparatus therefore, there is a buffer for receiving a data-signal input and for providing a data-signal output. A controller is coupled to receive fill-level information from the buffer and coupled to provide rate-control information to the buffer. The rate-control information is for controlling an output rate of the buffer for the data-signal output to be provided to a bus. The output rate is either a first rate or a second rate for providing the output rate of the data-signal output to the bus. The fill-level information is for selecting either the first rate or the second rate responsive to the buffer being either above or below a threshold fill level, respectively.

20 Claims, 6 Drawing Sheets

RATE CONTROLLED BUFFER FOR OUTPUT AT EITHER A FIRST OR SECOND RATE RESPONSIVE TO A FILL LEVEL

TECHNICAL FIELD

The following description relates to integrated circuit devices ("ICs"). More particularly, the following description relates to a rate controlled buffer for output at either a first rate or a second rate responsive to a fill level for an IC.

BACKGROUND

Telecommunications transmission systems are used to transport communication traffic signals geographically, and these traffic signals may be for voice-communications systems, the Internet, and/or other data client systems. These traffic or client signals in some instances are what is commonly referred to as "constant-bit-rate signals." By "constant-bit-rate signals," it is generally meant data streams having a constant bit-rate within defined limits. Conventionally, such constant-bit-rate signals are serial data transmission signals. Examples of telecommunications transmission systems for transporting such constant-bit-rate signals include Synchronous Optical Network ("SONET") and Optical Transport Network ("OTN"), among others. An example of a constant-bit-rate signal which is a voice-communication signal example is ITU 2048 kbit/s E1, and an example of a constant-bit-rate signal which is a data communication signal is IEEE 10GE (i.e., 10 Gb/s Ethernet). Of course, there are many other examples of constant-bit-rate signals for voice and data communication. However, in some instances constant-bit-rate signals may not be within permitted limits.

Hence, it is desirable and useful to provide control of constant-bit-rate signals such as for voice and/or data communication.

SUMMARY

An apparatus relates generally to data transmission. In such an apparatus, there is a buffer for receiving a data-signal input and for providing a data-signal output. A controller is coupled to receive fill-level information from the buffer and coupled to provide rate-control information to the buffer. The rate-control information is for controlling an output rate of the buffer for the data-signal output to be provided to a bus. The output rate is either a first rate or a second rate for providing the output rate of the data-signal output to the bus. The fill-level information is for selecting either the first rate or the second rate responsive to the buffer being either above or below a threshold fill level, respectively.

A method relates generally to data transmission. In such a method, a data-signal input is obtained by a buffer for providing a data-signal output. Fill-level information is obtained from the buffer by a controller. Rate-control information is provided from the controller to the buffer. An output rate of the buffer is controlled for the data-signal output responsive to the rate-control information. The controlling of the output rate includes selecting either a first rate or a second rate by the controller for providing the output rate of the data-signal output. The first rate and the second rate are selected responsive to the fill-level information being either above or below a threshold fill level of the buffer for the selecting of either the first rate or the second rate, respectively. The data-signal output is provided with the output rate selected to a bus.

A system relates generally to data transmission. In such a system, there is a plurality of transmission systems. An optical network interface is coupled to the plurality of transmission systems for multiplexing data-signal outputs of the plurality of transmission systems onto an optical transport medium. Each transmission system of the plurality of transmission systems includes: a buffer for receiving a respective data-signal input and for providing a respective data-signal output of the data-signal outputs; and a controller coupled to receive fill-level information from the buffer and coupled to provide rate-control information to the buffer. The rate-control information is for controlling an output rate of the buffer for the data-signal output to be provided to a respective bus. The bus is coupled to the optical network interface. The output rate is either a first rate or a second rate for providing the output rate of the data-signal output to the bus. The fill-level information is for respectively selecting either the first rate or the second rate responsive to the buffer being either above or below a threshold fill level of the buffer respectively associated with an upper bit-rate limit and a lower bit-rate limit associated with the optical network interface.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2 is a block diagram depicting an exemplary transmission system.

FIG. 3 is a block diagram depicting an exemplary transmission system which may be an implementation of the transmission system of FIG. 2.

DETAILED DESCRIPTION

Figure 1:
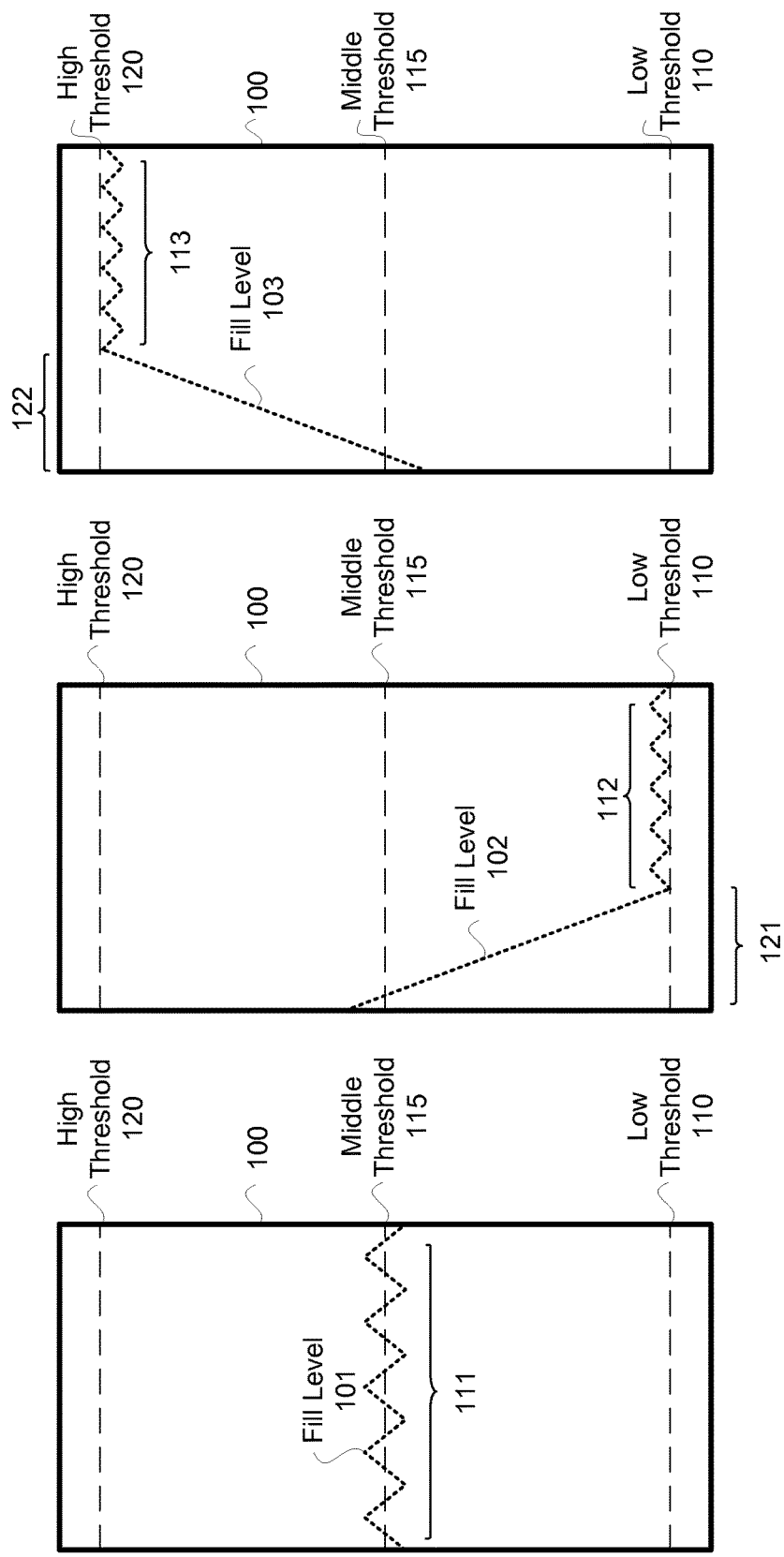
FIGS. 1-1 through 1-3 are respective block diagrams depicting three exemplary fill levels, respectively, for a regulated or controlled buffer.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

As previously described, transmission systems in some instances may have to tolerate constant-bit-rate client signals that are not within predetermined or predefined limits. As described below, a transmission system, which may be a telecommunications transmission system for example, is able to detect such an out-of-limit client signal, which may be a serial data signal for example, and convert a data rate of the out-of-limit client signal to a data rate conforming to downstream tolerances. Along those lines, a telecommunications transmission system conventionally is configured to accept data-signal inputs within predefined tolerances. In the past, if a data-signal input was not within the predefined tolerances (e.g., too fast or too slow), then such a conventional telecommunications transmission system may not be able to transmit the out-of-limit client signal.

As described below in additional detail, the bit-rate of a data-signal input may be checked at an ingress to a transmission system to determine if the signal is too fast or too slow. If the data-signal input is either too fast or too slow to such a transmission system, the data-signal input may be corrected (though possibly with the introduction of some distortion) to be within predefined bit-rate limits. A problem with an incoming signal may be corrected before the signal is passed onto a data transmission transport conduit of such a transmission system, such as a previously described telecommunication system for example. Along those lines, a rate-clamp controller may be coupled to a data-signal buffer to provide a buffer-control mechanism for outputting constant-bit-rate data signals that are to be inserted on traffic-data buses for transmission within such a system. A data signal with an out-of-tolerance bit-rate may be altered before being placed on a transport bus in an out-of-predefined bit-rate limit state, as such a data signal may be "clamped" prior to being placed onto such bus. By "clamping" the bit-rate, the bit-rate of a signal is brought within and/or held within limits. For those signals out-of-limits or having one or more portions out-of-limits, such clamping may involve discarding or replicating portions of the signals.

With the above general understanding borne in mind, various configurations for data transmission are generally described below.

Figure 2:
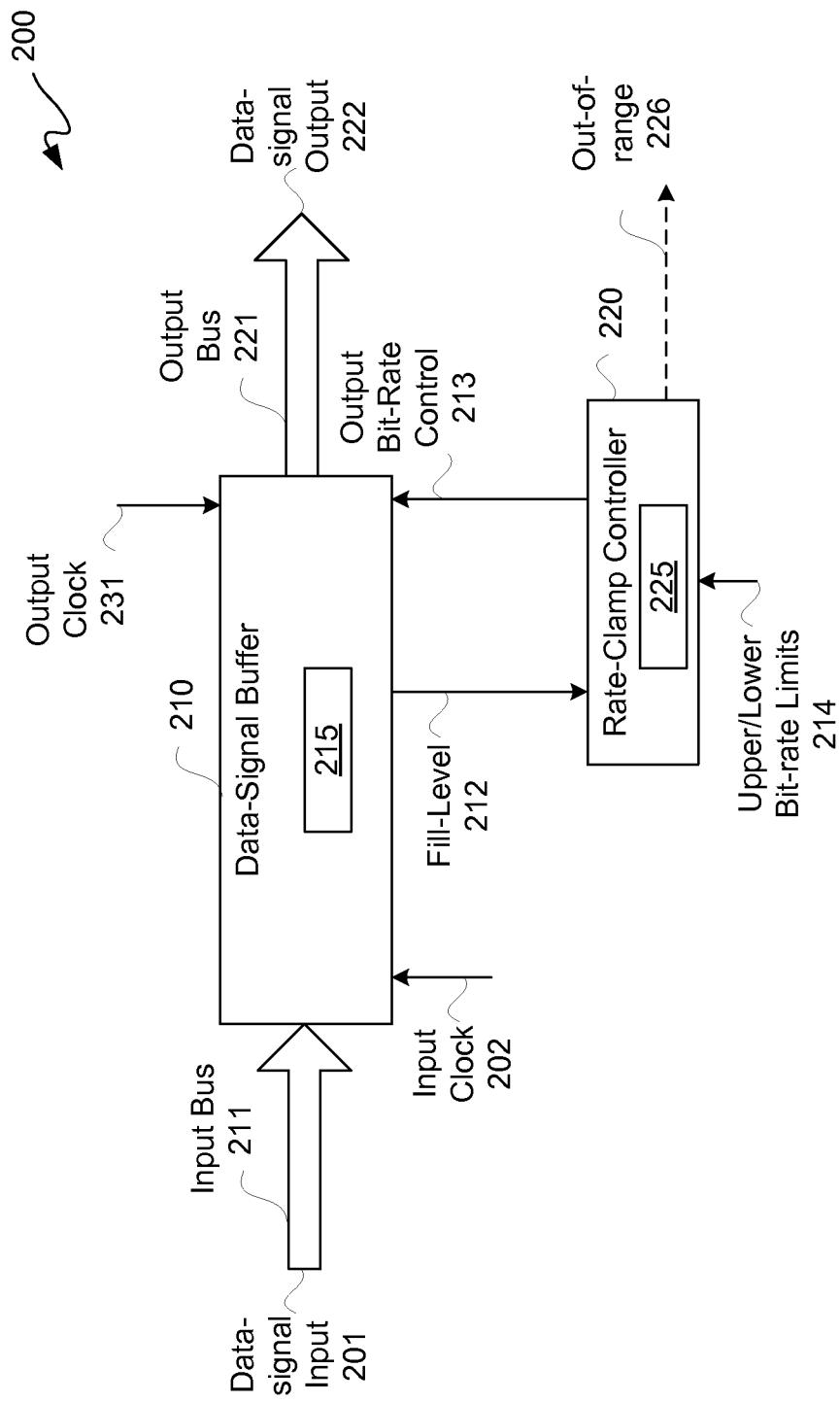
Figure 3:
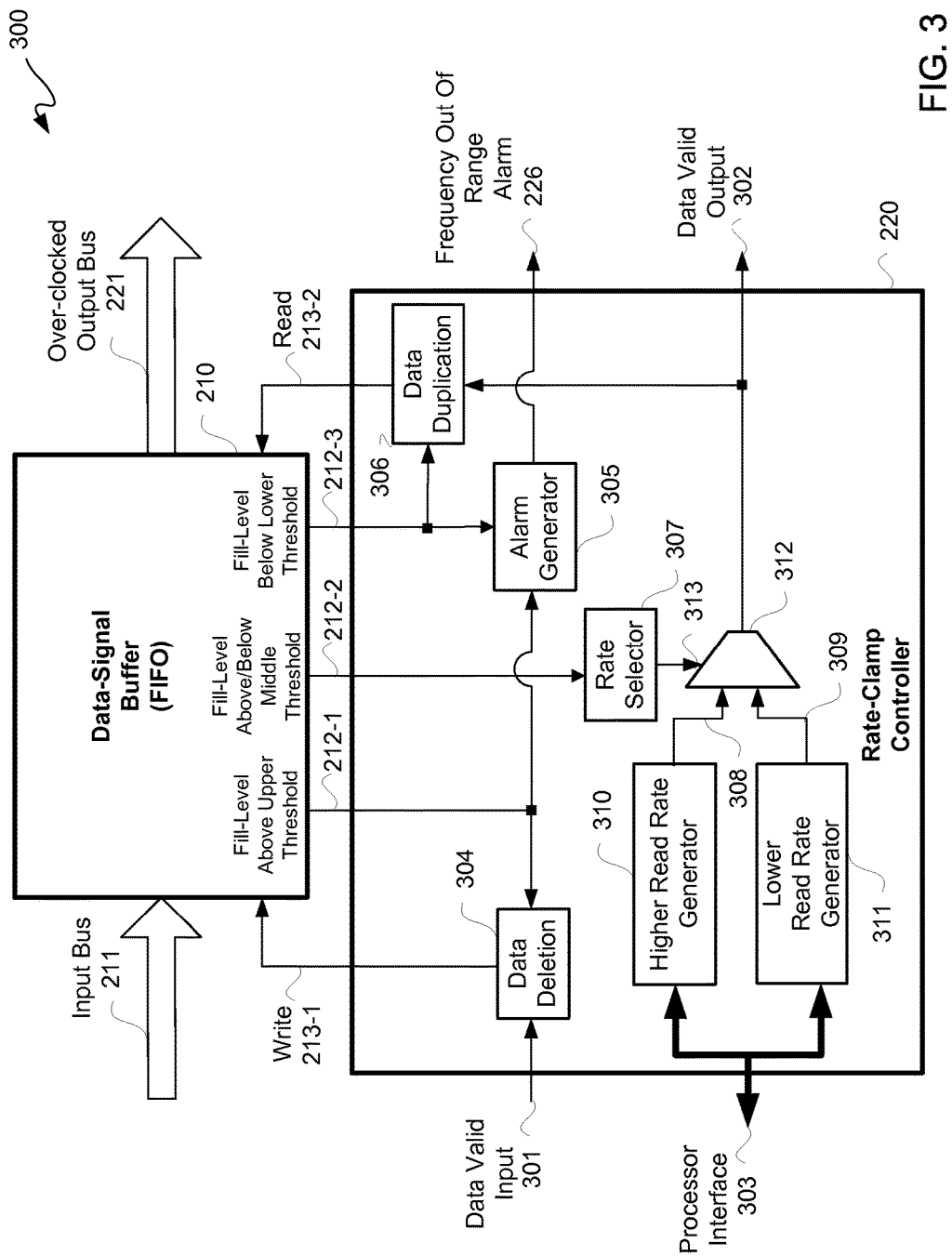

FIGS. 1-1 through 1-3 are respective block diagrams depicting three exemplary fill levels 101, 102, and 103, respectively, for a regulated or controlled buffer 100. Buffer 100 has a high threshold fill level 120. Along those lines, rate-of-change of a buffer fill level may be proportional to a bit-rate offset between a data rate of incoming data to a buffer ("incoming rate") and a data rate of outgoing data from such a buffer ("outgoing rate"). Thus, a high threshold fill level 120 of buffer 100 may be associated with an upper limit data rate corresponding to an incoming data-signal input of an excessively high bit-rate. A rate clamp may be used to rate-clamp to such an upper limit data or bit-rate, which for convenience is referred to herein as upper data or bit-rate 120. Additionally, buffer 100 has a low threshold fill level 110. Again, rate-of-change of a buffer fill level may be proportional to a bit-rate offset between a data rate of incoming data to a buffer ("incoming rate") and a data rate of outgoing data from such a buffer ("outgoing rate"). Thus, a low threshold fill level 110 of buffer 100 may be associated with a lower limit data rate corresponding to an incoming data-signal input of an excessively low bit-rate. A rate clamp may be used to rate-clamp to such a lower limit data or bit-rate, which for convenience is referred to herein as lower data or bit-rate 110. Between high threshold fill level 120 and low threshold fill level 110 is a middle threshold fill level 115, which for convenience is referred to herein as a normative or expected bit-rate 115. Normative or expected bit-rate 115 may be an average output rate of buffer 100, but buffer 100 has an instantaneous output data rate at either upper bit-rate 120 or lower bit-rate 110, as described below in additional detail.

When a fill level 101 is above middle threshold fill level 115, a faster read rate, namely upper bit-rate 120, of buffer 100 is used for pushing data onto an output bus. When a fill level 101 is below middle threshold fill level 115, a slower read rate, namely lower bit-rate 110, of buffer 100 is used. Thus, when a fill level 101 is at or approximately at middle threshold fill level 115, output read rate of buffer 100 averages to equal a corresponding input write rate of buffer 100. This may form a "sawtooth" or "zig-zag" pattern 111 about middle threshold fill level 115, where feedback control delay in switching back and forth between read rates 120 and 110 affects amplitudes of such oscillations. Buffer-fill level may have a sawtooth pattern with passing time, or a small square-wave/rectangular-wave pattern. This pattern is contingent how slow and fast rates incoming data rates are controlled, and thus this pattern may vary from implementation-to-implementation.

For example, if input data was arriving on average to have buffer 100 filled at a location exactly halfway between high threshold fill level 120 and middle threshold fill level 115, then about three-quarters of the input data would be put on an output bus using faster read rate, namely upper bit-rate 120, and about one-quarter of the input data would be put on an output bus using a slower read rate, namely a lower bit-rate 110. Effectively, these proportions of output data rate usage may be used to maintain a fill level that oscillates about middle threshold fill level 115. This is just one example, and other fractions may be used, as these proportions may vary responsive to the speed of an incoming data signal to buffer 100.

To recapitulate, buffer 100 has two read speeds, namely a fast read speed and a slow read speed. Proportionally toggling between these read speeds for a "bang-bang" control operation responsive to an input data rate may cause the fill level of buffer 100 to oscillate about middle threshold fill level 115.

Because the fill level of buffer 100 is generally about middle threshold fill level 115 for most input data rates, a more constant latency through buffer 100 may be provided. Generally, when a buffer 100 is filling, latency is increasing, and when buffer 100 is emptying, latency is decreasing. By generally maintaining a steady buffer-fill level, a minimization or reduction of delay variation, namely latency variation, may be provided.

As delay variations may lead to data wander and/or jitter, reducing delay variations, namely providing a more constant latency, may reduce data wander and/or jitter, which may make downstream data processing less problematic. For example, data wander is problematic when data is used for synchronization. So even though latency may not be exactly fixed due to oscillation of fill level about a middle threshold fill level 115, such latency may have less variation. Furthermore, even though the example of a middle threshold fill level 115 is used, other locations between high and low threshold fill levels 120 and 110 may be used depending upon the implementation.

In this example, high threshold fill level 120 is an almost full level, but in another implementation high threshold fill level 120 may be a full level. Likewise, in this example, low threshold fill level 110 is an almost empty level, but in another implementation low threshold fill level 110 may be an empty level.

The above examples assume that an input data rate is within an acceptable region of operation, namely generally between fill levels 110 and 120. However, an input data rate may be too slow or too fast, namely outside of an acceptable region of operation. Along those lines, sawtooth pattern 112 for fill level 102 is for driving or placing data onto an output bus at a data or bit-rate 110, and sawtooth pattern 113 for fill level 103 is for driving or placing data onto an output bus at a data or bit-rate 120.

When buffer 100 is emptying, as indicated by fill level 102 decreasing during interval 121, buffer 100 may reach a floor or lower bit-rate 110. This means that input data to buffer 100 is coming in at too slow a rate to have fill level 102 oscillate about middle threshold fill level 115. In other words, when the input rate is too slow, fill level 102 is below middle threshold fill level 115, so data is read out of buffer 100 at a slower read rate, namely clamped to lower bit-rate 110.

To prevent an output data or bit-rate from going below lower bit-rate 110, as fill level 102 might otherwise go below low threshold 110, buffered data, or bits thereof, can be duplicated for placing onto an output bus. This duplicating may be provided, for example, by holding a read buffer signal active to cause data to be duplicated. This approach avoids having additional circuitry and complexity, such as may be associated with attempting to pad data. In other words, when the fill level reaches low threshold fill level 110, dummy input data is inserted, which may prevent buffer 100 from an underflow condition. For reaching a low threshold fill level 110, an output rate may be clamped to a slower read rate, namely data or bit-rate 110. A sawtooth pattern 112 may be associated with toggling of a read buffer signal to clamp to lower bit-rate 110.

When buffer 100 is filling, as indicated by fill level 103 increasing during interval 122, buffer 100 may reach a ceiling or upper bit-rate 120. This means that input data to buffer 100 is coming in at too fast a rate to have fill level 103 oscillate about middle threshold fill level 115. In other words, when the input rate is too fast, fill level 103 is above middle threshold fill level 115, so data is read out of buffer 100 at a faster read rate, namely upper bit-rate 120.

To prevent an output data or bit-rate from going above upper bit-rate 120, as fill level 103 might otherwise go above high threshold fill level 120, buffered data, or bits thereof, is deleted or erased so as not to be placed onto an output bus. In other words, when fill level 103 reaches high threshold fill level 120, input data is effectively deleted. A write to buffer signal may be held, such as inactive low for example, so incoming data is not written into buffer 100, which may prevent buffer 100 from an overflow condition. For reaching a high threshold fill level 120, an output rate may be clamped to a faster read rate, namely data or bit-rate 120. A sawtooth pattern 113 may be associated with toggling of a write to buffer signal to clamp to upper bit-rate 120.

Even though artificially duplicating data or erasing data respectively for lower and upper bit-rate limits may corrupt or otherwise distort the data, data placed onto an output bus and sent downstream stays within tight bit-rate tolerances, such as for a telecommunications transmission system. Along those lines, in optical networking, a mapper expects a certain amount of data within a frame or other grouping of data, and so data may be duplicated or erased to comport to such a downstream parameter. If the data is corrupted, a mapper may initiate a maintenance request, which may lead to tracking down a data rate problem. Optionally, reaching either of lower bit-rate 110 or upper bit-rate 120 may trigger an alarm, as described below in additional detail.

By regulating bit-rate output of buffer 100 by clamping to either upper bit-rate 120 or lower bit-rate 110 respectively for an excessively high or low incoming data rate, at least two refined fill level patterns may emerge, namely an upper bit-rate fill-level pattern 113 and a lower bit-rate fill-level pattern 112. Even though these patterns are illustratively depicted as sawtooth patterns, other patterns may be used in other implementations. Such other patterns may include, for example, a ramp sawtooth pattern, a hysteresis-like pattern, and small square-wave/rectangular-wave pattern, among others, which may vary from implementation-to-implementation as previously described. Furthermore, even though data may be distorted when provided at either lower bit-rate 110 or upper bit-rate 120, such data may still be multiplexed onto on optical network, as data rate or bit-rate is within an acceptable range when leaving buffer 100.

Accordingly, buffer fill level may be used to detect when incoming data is too slow or too fast. Detection of either of these states, namely too slow or too fast, may be used to trigger control of bit-rate to within predefined limits. These examples of rate clamping may be for use in the context of an "over-clocked" output bus, as described below in additional detail.

FIG. 2 is a block diagram depicting an exemplary transmission system 200. Many known components of transmission system 200 are omitted for purposes of clarity and not limitation. Transmission system 200 may be for a telecommunications transmission system 200, such as previously described for example.

Transmission system 200 may include a data-signal buffer 210 and a rate-clamp controller 220. Data-signal buffer 210 may be buffer 100 of FIGS. 1-1 through 1-3. Data-signal buffer 210 may be coupled for receiving a data-signal input 201 and for providing a data-signal output 222. Data-signal input 201 may be serial data provided at a bit-rate onto input bus 211 for input into data-signal buffer 210. After buffering, data of data-signal input 201 may be output from data-signal buffer 210 as data-signal output 222 onto an output bus 221.

Output bus 221 may, though need not, be an "over-clocked" bus, namely a bus having more time slots for data than data-signal output 222 uses in a nominal situation. For example, if there were 100 time slots for loading data, a nominal output rate may use 95 of such 100 time slots. In other examples, a larger or smaller percentage than 95 percent of available time slots may be used for a nominal output rate. For example, as little as 2 percent excess capacity may be provided by an "over-clocked" bus 221. However, for purposes of clarity by way of example and not limitation, it shall be assumed that 95 percent of time slots available for data are used during nominal operation and the other 5 percent are available. For a telecommunications transmission system, even a 2 percent excess capacity may seem a substantially large amount of excess capacity.

An over-clocked bus 221 may be used to accommodate transmission of data-signal inputs 201 of varying bit-rates, namely a maximum data or bit-rate of such varying bit-rates. For example, bit-rates of data-signal inputs 201 may vary by one or two percent or other amount of variation from a nominal rate, and excess capacity of an over-clocked output bus 221 may be used to accommodate such variation, in particular with respect to a high-side of 95 percent.

However, over-clocked bus 221 may be used to couple transmission system 200 to a telecommunications transmission system. A telecommunications transmission system may have a much tighter control on data or bit-rate. For example, bit-rates of data-signal outputs 221 may be limited to approximately 100 parts per million positive and negative or other amount of variation for being put onto a telecommunications transmission system. These telecommunication transmission system tolerances are much smaller or tighter than even the above example of 2 percent.

If these stricter telecommunications transmission system limits are not met, an overflow or underflow error may result downstream from the transmission of data-signal output 222. Thus, even though excess capacity of an over-clocked output bus 221 may be used to accommodate variation in data rate of one or more signals provided as data-signal input 201, this variation may be too great to pass on to a telecommunications transmission system. In other words, adjustment or control to handle frequency variation in incoming data-signal input 201 is stricter than the capacity of over-clocked bus 221 to handle such variation.

To control data-signal output 222 for a tighter control, such as that of a telecommunications transmission system, a rate-clamp controller 220 may be used as described herein. Rate-clamp controller 220 may be coupled to receive fill-level information, such as by a fill-level signal 212, from data-signal buffer 210. Rate-clamp controller 220 may be coupled to provide output bit-rate-control information, such as by output bit-rate control signal 213, to data-signal buffer 210. Data-signal buffer 210 may be configured for controlling data rate of data-signal output 222 for providing onto output bus 221 in response to output bit-rate control information received from output bit-rate control signal 213. In an implementation, data-signal buffer 210 may be a first-in, first-out buffer ("FIFO").

Rate-clamp controller 220 may be coupled to receive an upper bit-rate limit and a lower bit-rate limit, such as via upper/lower bit-rate limits signal 214. These upper and lower bit-rate limits may be stored in registers, memory, or other storage in circuitry 225 of rate-clamp controller 220. In another configuration, rate-clamp controller may be pre-assigned or pre-configured with upper and lower bit-rate limits. These upper and lower bit-rate limits may be acceptable bit-rate limits for data-signal output 222 to be transmitted downstream in a telecommunications transmission system without causing an overflow or underflow condition. Both of these upper and lower bit-rate limits are less than the maximum bit-rate of over-clocked bus 221.

Data-signal input 201 may be clocked from an input line or bus 211 at a bit-rate of data-signal input 201, such as by input clock signal 202 provided to clock an input side of data-signal buffer 210. Buffered data 215, namely data loaded in data-signal buffer 210, may be placed on an output "over-clocked" output bus 221 for onward transmission, such as may be provided to a telecommunications transmission system. Over-clocked output bus 221 may have an excessive bit-rate capacity as previously described, and thus over-clocked output bus 221 may be operated at any of a variety of controlled bit-rates lower than a maximum bit-rate capacity of over-clocked output bus 221.

Along those lines, input clock 202 may be one clock rate from a selection of fixed clock rates. For FPGA and other fixed clock implementations of transmission system 200, data-signal buffer 210 is not auto-tuned to frequencies of client transport signals, such as to a frequency of data-signal input 201. To accommodate various frequencies of data-signal input 201, and thus various data or bit-rates, fixed clock signals spanning a variety of frequencies may be implemented. In another implementation, input clock 202 may be auto-tuned to frequency of data-signal input 201.

To accommodate various frequencies or variations in frequencies of data-signal input 201, and thus various data or bit-rates, an over-clocked output bus 221 may be used. An over-clocked output bus 221 may be capable of handling a maximum data or bit-rate of various data-signal inputs 201. However, data or bit-rate of data-signal output 222 provided to a telecommunications transmission system can be neither too slow nor too fast.

A rate at which data is carried on over-clocked output bus 221 may be controlled by a refined pattern of valid-to-invalid signals on over-clocked output bus 221. This refined pattern may be generated using upper and lower bit-rate limits. Continuing the above example, generally over sufficiently long periods of time, 95 percent of clock instances or time slotted signals may be valid and 5 percent of such clock instances or time slotted signals may be invalid. By controlling a precise proportion of valid to invalid instances of data signals in over-clocked bus 221 over sufficiently long time periods, a precise bit-rate on over-clocked bus 221 may be obtained.

As described herein, there are generally two output rates, namely one generally associated with an upper bit- or data-rate limit and another one generally associated with a lower bit- or data-rate limit, of upper/lower bit-rate limits signal 214. As described herein, fill-level patterns for either of these rates may in effect be "sawtooth" patterns; however, as data in these patterns occur at different rates and with different data manipulations, such patterns may be different. Furthermore, if either limit associated with upper/lower bit-rate limits signal 214 is reached, such that output of data-signal buffer 210 is clamped to effect either lower bit-rate 110 or upper bit-rate 120, an out-of-range signal 226 provided as an output for rate-clamp controller 220 may be asserted. Assertion of out-of-range signal 226 may cause an alarm to trigger.

Rate-clamp controller 220 receives fill-level information for data-signal buffer 210. This fill-level information may be in relation to a normative or expected fill level. For "bang-bang" control by rate-camp controller 220, if the fill-level information indicates that a current fill-level is above an expected level, rate-clamp controller 220 controls an output clock-rate of data-signal buffer 210 to place data onto over-clocked output bus 221 at an upper bit-rate limit. If the fill-level information indicates that a current fill-level is below an expected level, rate-clamp controller 220 controls the output clock-rate of data-signal buffer 210 to place the data onto over-clocked output bus 221 at a low bit-rate limit. A bang-bang clock control upon a buffer fill deviating from a norm or expected fill level range may provide a low deviation in buffer fill, and thus a narrow deviation in buffer latency. In other words, by having a rate-clamp controller 220 configured for bang-bang control for selection of either a first rate or a second rate for data output, latency of a data-signal buffer 210 may be associated with maintaining a fill level of the buffer, at least approximately, at a middle or other determined threshold fill level of such buffer.

Thus, rate-clamp controller 220 may ensure that an outgoing bit-rate of data-signal output 222 from data-signal buffer 210 does not exceed either an upper or lower assigned limit. If a data-signal input bit-rate of data-signal input 201 is outside either an upper or lower data rate limit, data-signal buffer 210 eventually may start to fill or empty, respectively. However, when an output bit-rate of data-signal output 222 is clamped to either such upper or lower data rate limit, portions of data-signal input 201 are either discarded (i.e., erased) or extended (i.e., duplicated), respectively, to maintain an apparent output bit-rate within assigned limits. Along those lines, an apparent output bit-rate may be maintained within assigned limits without having to perform measurements.

In the above-described example, buffered data 215 is clocked out of data-signal buffer 210 responsive to a fixed output clock signal 231, namely a stable output clock frequency, to provide data-signal output 222 onto an over-clocked bus 221. Thus, operation of over-clocked bus 221 may be at a frequency of output clock signal 231. However, even though an over-clocked bus 221 and a fixed output clock signal 231 were described, in another implementation output bus 221 may be a controlled variable bit-rate bus that is not an over-clocked type. Thus, even though an over-clocked bus 221 may be used for bit-rate control as described herein, in other implementations another configuration of busing may be used.

Furthermore, controller 220 in another implementation may have another control mechanism on output bit-rate. For example, output bit-rate may be controlled to equal a mean of upper and lower bit-rate limits, where data-signal buffer 210 has an expected operational fill-level associated with such mean. Additionally, even though serial data-streams for input to and output from data-signal buffer 210 were described, in another implementation parallel data buses to and from data-signal buffer 210 may be used.

As described herein, write to buffer and read from buffer signals may be maintained in a non-asserted (i.e., inactive) state or an asserted (i.e., active) state to effectively control output clocking rate or fill level of data-signal buffer 210 with a fixed output clock 231. As described, upper and lower data or bit-rate limits are used as deliberate clocking levels to place bounds on buffer output level of data-signal buffer 210. Rate control by use of write and read signals is responsive to a current buffer-fill level. However, in another configuration, buffer fill level may be used to control rate of a variable frequency input clock signal 202 or a variable frequency output clock signal 231. Furthermore, rather than throttling an output clock rate of data-signal buffer 210, output clock signal 231 may be selected as either a high speed clock or a low speed clock responsive to fill-level as previously described for limiting to an upper or lower bit-rate, respectively.

Accordingly, even though the following figure is a more detailed description of the afore-described exemplary implementation, in other implementations these and/or other components may be present. Furthermore, the following description is for an FPGA implementation. However, a dedicated hardware, field programmable hardware, software, or a combination of any two or more of these approaches may be used in other implementations.

FIG. 3 is a block diagram depicting an exemplary transmission system 300. Transmission system 300 may be an implementation of transmission system 200 of FIG. 2. In this example, data-signal buffer 210 is a FIFO, and rate-clamp controller 220 includes a processor interface 303, among other components.

Figure 4:
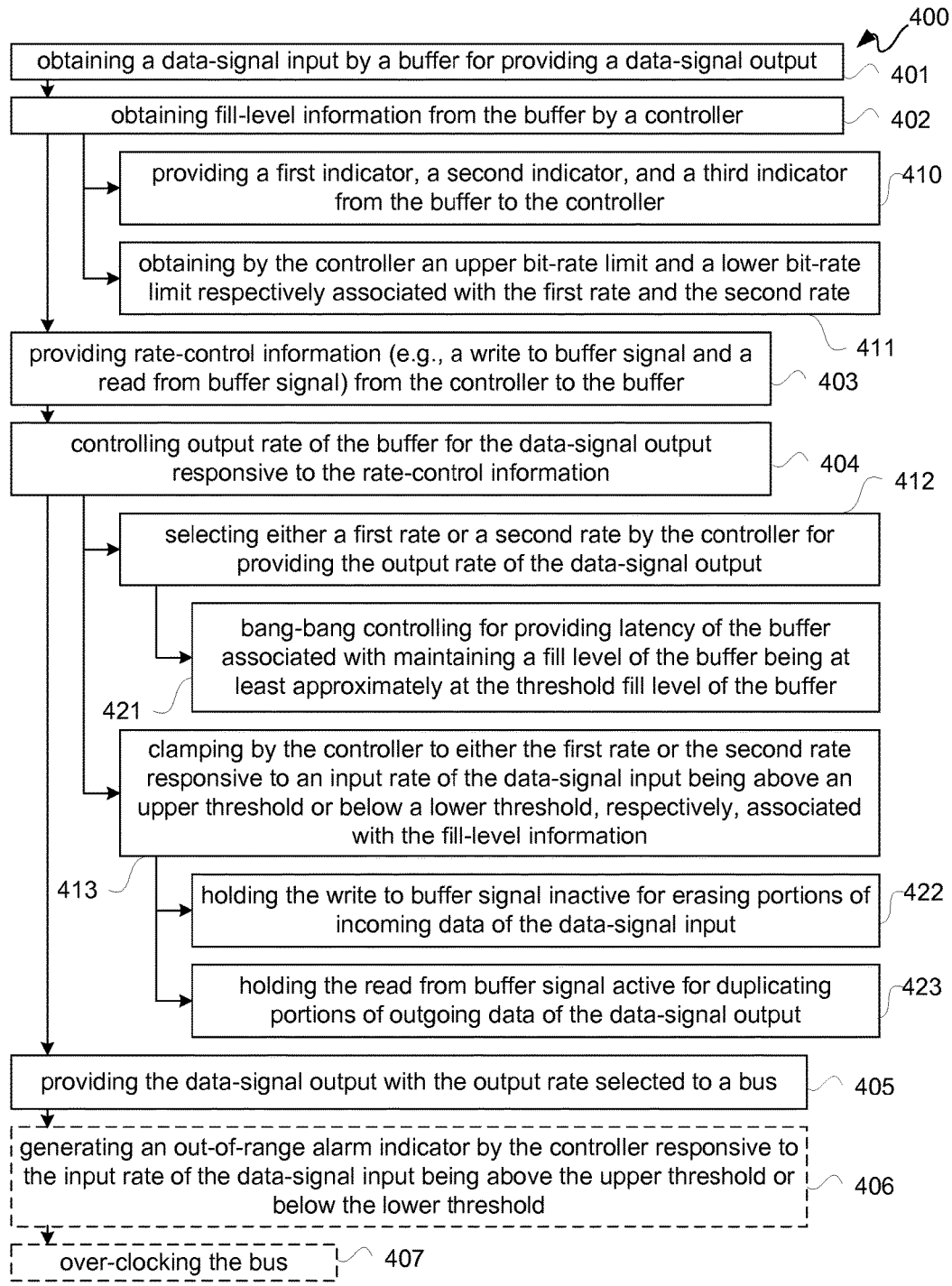
FIG. 4 is a flow diagram depicting an exemplary data transmission process, such as for the transmission system as in FIG. 2.

FIG. 4 is a flow diagram depicting an exemplary data transmission process 400, such as for a transmission system 200 as in FIG. 2. Transmission system 300 and data transmission process 400 are further described with simultaneous reference to FIGS. 1-4.

At 401, a data-signal input 201 may be obtained by a buffer, such as data-signal buffer 210, via input bus 211 for providing a data-signal output 222 via over-clocked output bus 221. At 402, fill-level information may be obtained from data-signal buffer 210 by a controller, such as rate-clamp controller 220.

In this example, rate-clamp controller 220 includes processor interface 303, higher read rate generator 310, lower read rate generator 311, multiplexer 312, data deletion control block 304, alarm generator 305, data duplication control block 306, and rate selector 307. Processor interface 303 may be for communication with an internal processor core, such as in an FPGA or other System-on-Chip (SoC), or for communication with an external processor core.

Obtaining the fill-level information at 402 may include at 410 providing a first indicator signal 212-1, a second indicator signal 212-2, and a third indicator signal 212-3 for fill-level 212 from data-signal buffer 210 to rate-clamp controller 220. As previously described, in an implementation a threshold fill level may be a middle threshold 115.

First indicator signal 212-1 may be associated with a current fill level of data-signal buffer 210 being above an upper threshold 120 located above middle threshold 115. Second indicator signal 212-2 may be associated with a current fill level of data-signal buffer 210 being either above or below middle threshold 115. For example, a logic 0 may indicate the current fill level being below middle threshold 115, and a logic 1 may indicate the current fill level being above middle threshold 115. Third indicator signal 212-3 may be associated with a current fill level of data-signal buffer 210 being below a lower threshold 110 located below middle threshold 115.

Obtaining the fill-level information at 402 may include at 411 obtaining by rate-clamp controller 220 an upper bit-rate limit and a lower bit-rate limit respectively associated with a first output rate and a second output rate of data-signal buffer 210. These upper and lower rate limits may be provided via processor interface 303 respectively to higher read rate generator 310 and lower read rate generator 311. In response to these upper and lower rate limits, higher read rate generator 310 and lower read rate generator 311 may respectively generate a high read rate signal 308 and a low read rate signal 309 corresponding to such first and second output rates.

High read rate signal 308 and low read rate signal 309 may be respective inputs to multiplexer 312 for the selection of a data valid output signal 302 therefrom, where the selection is responsive to a control select signal 313 sourced from rate selector 307. Rate selector 307 may be coupled to receive second indicator signal 212-2, as described below in additional detail.

At 403, rate-control information may be provided from rate-clamp controller 220 to data-signal buffer 210. This rate-control information may be in the form of a write-to-buffer ("write" or "write enable") signal 213-1 and a read-from-buffer ("read" or "read enable") signal 213-2.

At 404, the output rate of data-signal buffer 210 may be controlled for data-signal output 222, responsive to rate-control information provided at 403. Controlling the output rate at 404 may include selecting at 412 either a first output rate or a second rate by rate-clamp controller 220 for providing such an output rate of data-signal output 222. Along those lines, rate selector 307 may be coupled to receive second indicator signal 212-2, as described below in additional detail. As a first output rate and a second output rate of data-signal buffer 210 are respectively above and below a middle threshold fill level of data-signal buffer 210, effectively second indicator signal 212-2 indicates to rate selector 307 whether or not to assert control select signal 313 for bang-bang control. This selecting at 412 may include at 421 bang-bang controlling by rate-clamp controller 220 for providing latency of or through data-signal buffer 210 associated with maintaining a fill level of data-signal buffer 210 at least approximately at a threshold fill level of data-signal buffer 210. In this example, a medium threshold 115 is used, but as previously indicated another threshold may be used for a threshold fill level.

If second indicator signal 212-2 indicates that a current fill level of data-signal buffer 210 is above medium threshold 115, then rate selector 307 may assert control select signal 313 to select high read rate signal 308 for output from multiplexer 312. Conversely, for example, if second indicator signal 212-2 indicates that a current fill level of data-signal buffer 210 is below medium threshold 115, then rate selector 307 may not assert or may de-assert control select signal 313 to select a low read rate signal 309 for output from multiplexer 312. Output from multiplexer 312 may be provided as a data valid output signal 302 from rate-clamp controller 220 and may be provided as an input to data duplication control block 306.

At 405, data-signal output 222 with a selected output rate may be provided to an output bus 221. Optionally, at 407, output bus 221 may be over-clocked to provide an over-clocked output bus 221.

As previously indicated, there may be a situation where an input data rate of data-signal input 201 is too slow or too fast. Along those lines, controlling of an output rate of data-signal buffer 210 at 404 may include at 413 clamping by rate-clamp controller 220 to either a first output rate or a second rate. This clamping at 413 may be responsive to an input rate of data-signal input 201 being above an upper threshold 120 or below a lower threshold 110, respectively, associated with fill-level information. Such fill-level information may be provided from first indicator signal 212-1 or third indicator signal 212-3 respectively for clamping by rate-clamp controller 220 to either a first output rate or a second rate.

Clamping at 413 for data input that is too slow may include holding or maintaining read signal 213-2 in an active state, to duplicate portions of buffered data 215 for output from data-signal buffer 210. Inputs to data duplication control block 306 may be third indicator signal 212-3, as well as either a high read rate signal 308 or a low read rate signal 309 as output from multiplexer 312.

Data duplication control block 306 outputs and controls the application of read signal 213-2 provided to data-signal buffer 210. For example, if third indicator signal 212-3 is asserted, indicating that a current fill level of data-signal buffer 210 is below a lower threshold 110, then data duplication control block 306 may at 423 hold read signal 213-2 active, for duplicating portions of outgoing data of data-signal output 222, which effectively clamps output of data-signal buffer 210 to low read rate signal 309. However, if third indicator signal 212-3 is not asserted or is de-asserted, indicating that a current fill level of data-signal buffer 210 is not below a lower threshold 110, then data duplication control block 306 may allow read signal 213-2 to toggle between active and not active, for switching between high and low read rate signals 308 and 309 sourced from output of multiplexer 312.

Clamping at 413 for data input that is too fast may include holding or maintaining write signal 213-1 in a non-active state, to delete portions of incoming data of data-signal input 201 provided to data-signal buffer 210. Inputs to data deletion control block 304 may be first indicator signal 212-1, as well as a data valid input signal 301 provided as an input to rate-clamp controller 220.

Data deletion control block 304 outputs and controls the application of write signal 213-1 provided to data-signal buffer 210. For example, if first indicator signal 212-1 is asserted, indicating that a current fill level of data-signal buffer 210 is above a higher threshold 120, then data deletion control block 304 may at 422 hold write signal 213-1 inactive for deleting portions of incoming data of data-signal input 201, which effectively clamps output of data-signal buffer 210 to high read rate signal 308 output from multiplexer 312. In other words, even if data valid input signal 301 is asserted, indicating that data is ready to be delivered to data-signal buffer 210, write signal 213-1 may be held inactive by data deletion control block 304, to cause such readied data to not be passed along into data-signal buffer 210, namely to be deleted or erased when a write cycle is overwritten with a subsequent write cycle. However, if first indicator signal 212-1 is not asserted or is de-asserted indicating that a current fill level of data-signal buffer 210 is not above an upper threshold 120, then data deletion control block 304 may allow write signal 213-1 to toggle between active and not active, for switching between high and low read rate signals 308 and 309 sourced from the output of multiplexer 312.

First indicator signal 212-1 and third indicator signal 212-3 may be respective inputs to alarm generator 305. For example, if either of first indicator signal 212-1 or third indicator signal 212-3 is asserted, indicating an above upper threshold 120 or below lower threshold 110 condition, respectively, of a current fill level of data-signal buffer 210, then optionally at 406 an out-of-range alarm indicator 226 may be generated by alarm generator 305 of rate-clamp controller 220 in effect responsive to an input rate of data-signal input 201 being above upper bit-rate 120 or below lower bit-rate rate 110.

Figure 5:
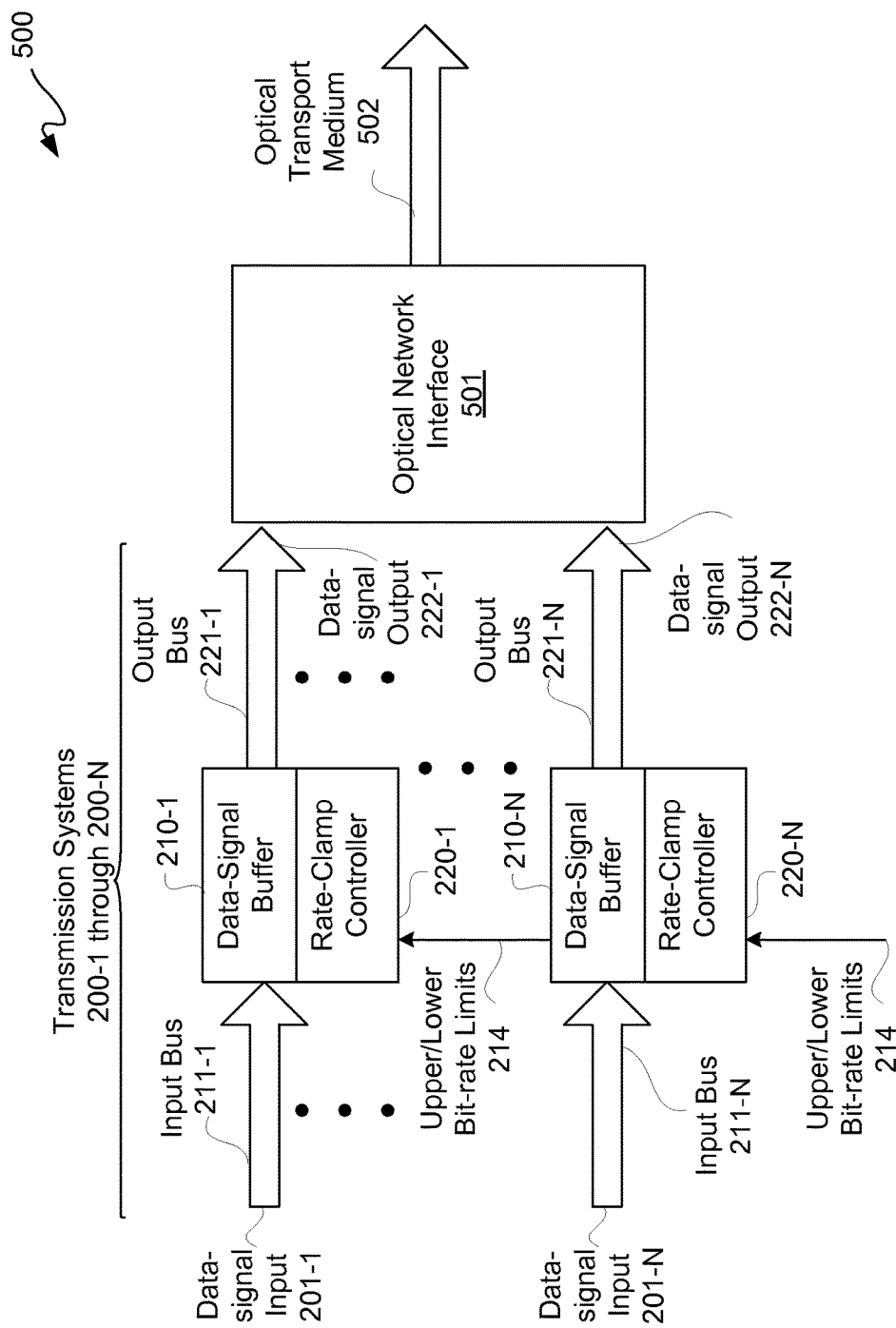
FIG. 5 is a block diagram depicting an exemplary electrical-to-optical system for data transmission.

FIG. 5 is a block diagram depicting an exemplary electrical-to-optical system 500 for data transmission. Electrical-to-optical system 500 includes a plurality of transmission systems 200-1 through 200-N, where each of transmission systems 200-1 through 200-N may be configured as previously described, for example, with reference to transmission system 200 of FIG. 2.

Transmission systems 200-1 through 200-N may be coupled to receive data-signal inputs 201-1 through 201-N respectively to corresponding input buses 211-1 through 211-N. Input buses 211-1 through 211-N are respectively coupled to data-signal buffers 210-1 through 210-N, and data-signal buffers 210-1 through 210-N may each be respectively coupled to rate-clamp controllers 220-1 through 220-N, such as previously described. However, in this configuration, a common set of upper and lower bit-rate limits may be provided to each of rate-clamp controllers 220-1 through 220-N commonly coupled to receive upper/lower bit-rate limits signal 214.

Output buses 221-1 through 221-N may respectively couple data-signal outputs 222-1 through 222-N from corresponding data-signal buffers 210-1 through 210-N to an optical network interface 501. Optical network interface 501 may be coupled to transmission systems 200-1 through 200-N for multiplexing data-signal outputs 222-1 through 222-N, respectively, from transmission systems 200-1 through 200-N onto an optical transport medium 502.

Each of data-signal buffers 210-1 through 210-N have a same upper output rate limit and a same lower output rate limit. However, data-signal inputs 201-1 through 201-N may be at same or different frequencies. Accordingly, upper and lower threshold fill levels of data-signal buffers 210-1 through 210-N may be respectively associated with an upper bit-rate limit and a lower bit-rate limit of an optical network associated with optical network interface 501. However, an operational fill-level threshold, such as middle threshold 115 for example, may be the same or different among data-signal buffers 210-1 through 210-N. Again, each of rate-clamp controllers 220-1 through 220-N may be configured for bang-bang control for selection of either a higher read rate or a lower read rate, to provide latency through each of data-signal buffers 210-1 through 210-N associated with maintaining an operational fill-level threshold respectively for each of such buffers, at least approximately at such an operation threshold fill level, to control downstream wander for transmitting data via optical transport medium 502 of an optical network.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 6:
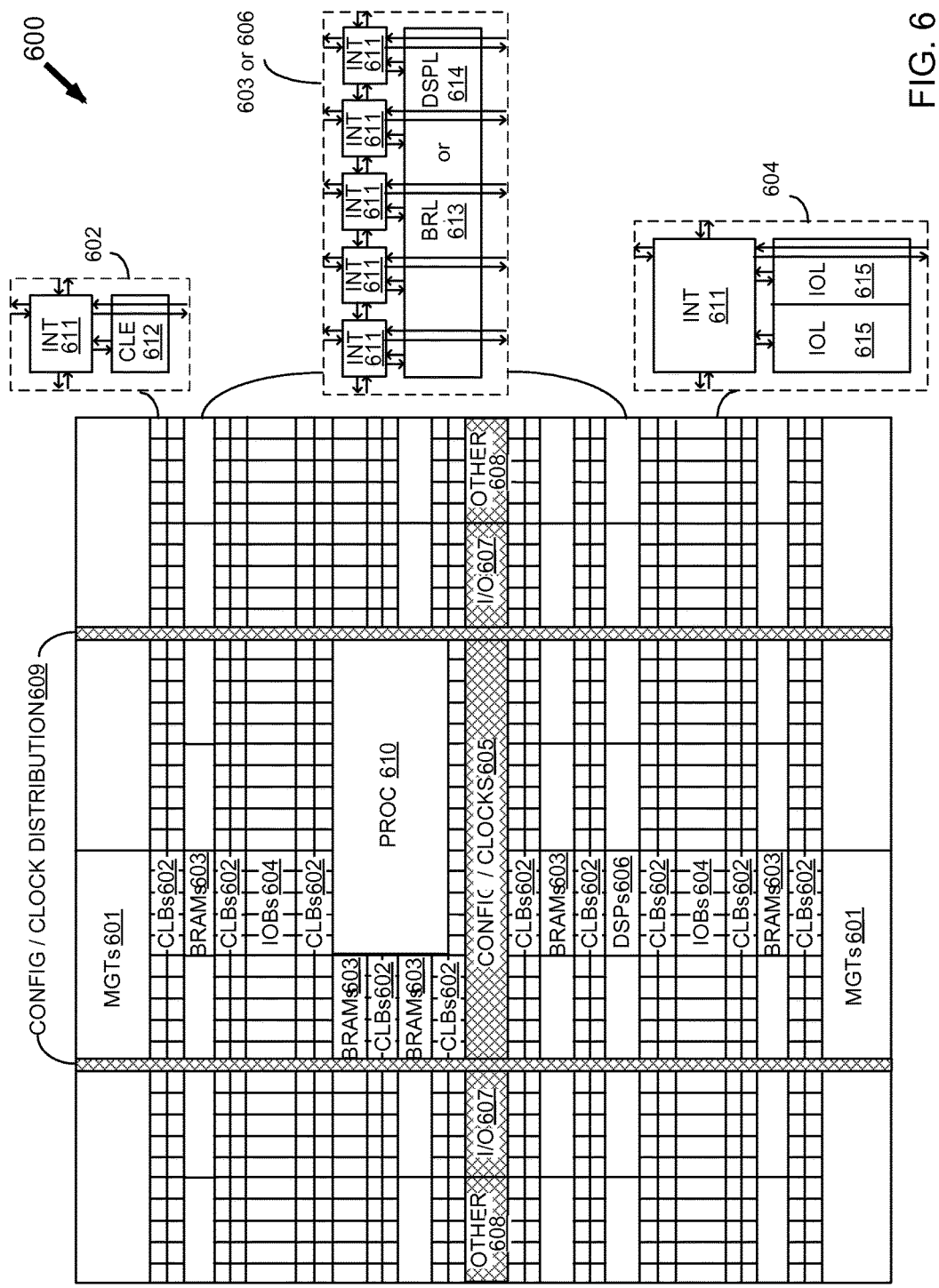
FIG. 6 is a simplified block diagram depicting an exemplary columnar Field Programmable Gate Array ("FPGA") architecture.

As noted above, advanced FPGAs can include several different types of programmable logic blocks in the array. For example, FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output blocks ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610.

In some FPGAs, each programmable tile includes a programmable interconnect element ("INT") 611 having standardized connections to and from a corresponding interconnect element in each adjacent tile. Therefore, the programmable interconnect elements taken together implement the programmable interconnect structure for the illustrated FPGA. The programmable interconnect element 611 also includes the connections to and from the programmable logic element within the same tile, as shown by the examples included at the top of FIG. 6.

For example, a CLB 602 can include a configurable logic element ("CLE") 612 that can be programmed to implement user logic plus a single programmable interconnect element ("INT") 611. A BRAM 603 can include a BRAM logic element ("BRL") 613 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element ("DSPL") 614 in addition to an appropriate number of programmable interconnect elements. An 10B 604 can include, for example, two instances of an input/output logic element ("IOL") 615 in addition to one instance of the programmable interconnect element 611. As will be clear to those of skill in the art, the actual I/O pads connected, for example, to the I/O logic element 615 typically are not confined to the area of the input/output logic element 615.

In the pictured embodiment, a horizontal area near the center of the die (shown in FIG. 6) is used for configuration, clock, and other control logic. Vertical columns 609 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 610 spans several columns of CLBs and BRAMs.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for data transmission, comprising:
    a buffer for receiving a data-signal input and for providing a data-signal output;
    a controller coupled to receive fill-level information from the buffer and coupled to provide rate-control information to the buffer;
    the rate-control information being for controlling an output rate of the buffer for the data-signal output to be provided to a bus;
    the output rate being either a first rate or a second rate for providing the output rate of the data-signal output to the bus;
    the fill-level information being for selecting either the first rate or the second rate responsive to the buffer being either above or below a threshold fill level, respectively;
    the controller configured to clamp the output rate to either the first rate or the second rate using bang-bang control, wherein the first rate is greater than the second rate.

2. The apparatus according to claim 1, wherein the bus is an over-clocked bus.

3. The apparatus according to claim 2, wherein the controller is coupled to receive an upper bit-rate limit and a lower bit-rate limit respectively associated with the first rate and the second rate.

4. The apparatus according to claim 1, wherein the fill-level information includes a first indicator, a second indicator, and a third indicator.

5. The apparatus according to claim 4, wherein:
    the threshold fill level is a middle threshold;
    the first indicator is associated with a fill level of the buffer being above an upper threshold located above the middle threshold;
    the second indicator is associated with the fill level of the buffer being either above or below the middle threshold; and
    the third indicator is associated with the fill level of the buffer being below a lower threshold located below the middle threshold.

6. The apparatus according to claim 1, wherein the controller is configured to clamp to either the first rate or the second rate responsive to an input rate of the data-signal input being above an upper threshold or below a lower threshold, respectively, associated with the fill-level information.

7. The apparatus according to claim 6, wherein the controller is configured to hold:
    a write to buffer signal inactive for erasing portions of incoming data of the data-signal input; and
    a read from buffer signal active for duplicating portions of outgoing data of the data-signal output.

8. The apparatus according to claim 6, wherein the controller comprises an alarm generator for generating an out-of-range alarm indicator responsive to the input rate of the data-signal input being above the upper threshold or below the lower threshold.

9. The apparatus according to claim 1, wherein the controller comprises a rate-clamp controller for clamping the output rate to either the first rate or the second rate.

10. The apparatus according to claim 1, wherein the controller is configured to use the bang-bang control for selection of either the first rate or the second rate to provide latency of the buffer associated with maintaining a fill level of the buffer at least approximately at the threshold fill level of the buffer.

11. A method for data transmission, comprising:
    obtaining a data-signal input by a buffer for providing a data-signal output;
    obtaining fill-level information from the buffer by a controller;
    providing rate-control information from the controller to the buffer;
    controlling an output rate of the buffer for the data-signal output responsive to the rate-control information;
    wherein the controlling of the output rate comprises:
        selecting either a first rate or a second rate by the controller to clamp the output rate of the data-signal output using bang-bang control, wherein the first rate is greater than the second rate; and
        wherein the first rate and the second rate are selected responsive to the fill-level information being either above or below a threshold fill level of the buffer for selection of the first rate or the second rate, respectively; and
    providing the data-signal output with the output rate selected to a bus.

12. The method according to claim 11, further comprising over-clocking the bus.

13. The method according to claim 12, further comprising obtaining by the controller an upper bit-rate limit and a lower bit-rate limit respectively associated with the first rate and the second rate.

14. The method according to claim 11, wherein:
    the obtaining of the fill-level information comprises providing a first indicator, a second indicator, and a third indicator from the buffer to the controller;
    the threshold fill level is a middle threshold;
    the first indicator is associated with a fill level of the buffer being above an upper threshold located above the middle threshold;
    the second indicator is associated with the fill level of the buffer being either above or below the middle threshold; and
    the third indicator is associated with the fill level of the buffer being below a lower threshold located below the middle threshold.

15. The method according to claim 11, wherein the controlling of the output rate of the buffer comprises clamping by the controller to either the first rate or the second rate responsive to an input rate of the data-signal input being above an upper threshold or below a lower threshold, respectively, associated with the fill-level information.

16. The method according to claim 15, wherein:
    the rate-control information comprises a write to buffer signal and a read from buffer signal; and
    the clamping comprises:
        holding the write to buffer signal inactive for erasing portions of incoming data of the data-signal input; and holding the read from buffer signal active for duplicating portions of outgoing data of the data-signal output.

17. The method according to claim 15, further comprising generating an out-of-range alarm indicator by the controller responsive to the input rate of the data-signal input being above the upper threshold or below the lower threshold.

18. The method according to claim 11, wherein the selecting by the controller using the bang-bang control is for providing latency of the buffer associated with maintaining a fill level of the buffer at least approximately at the threshold fill level of the buffer.

19. A system for data transmission, comprising:
a plurality of transmission systems;
an optical network interface coupled to the plurality of transmission systems for multiplexing data-signal outputs of the plurality of transmission systems onto an optical transport medium;
wherein each transmission system of the plurality of transmission systems comprises:
    a buffer for receiving a respective data-signal input and for providing a respective data-signal output of the data-signal outputs;
    a controller coupled to receive fill-level information from the buffer and coupled to provide rate-control information to the buffer;
    the rate-control information being for controlling an output rate of the buffer for the data-signal output to be provided to a respective bus;
    the bus being coupled to the optical network interface;
    the output rate being clamped to either a first rate or a second rate for providing the output rate of the data-signal output to the bus using bang-bang control for selection of either the first rate or the second rate, wherein the first rate is greater than the second rate; and
    wherein the fill-level information is for respectively selecting either the first rate or the second rate respectively responsive to the buffer being either above or below a threshold fill level of the buffer, the first rate and the second rate respectively associated with an upper bit-rate limit and a lower bit-rate limit associated with the optical network interface.

20. The system according to claim 19, wherein the controller is configured to use the bang-bang control for selection of either the first rate or the second rate to provide latency of the buffer associated with maintaining a fill level of the buffer at least approximately at the threshold fill level of the buffer to control downstream wander for transmitting the data via the optical transport medium.

* * * * *